United States Patent [19]

McCarthy

[11] 3,709,551
[45] Jan. 9, 1973

[54] TRAVEL TRAILER CONSTRUCTION
[75] Inventor: James F. McCarthy, Broadview, Ill.
[73] Assignee: Free Winds, Inc., Geneva, Ill.
[22] Filed: Jan. 28, 1971
[21] Appl. No.: 110,562

Related U.S. Application Data

[63] Continuation of Ser. No. 767,343, Oct. 14, 1968, Pat. No. 3,560,042.

[52] U.S. Cl. .........................296/23 R, 296/27, 52/66
[51] Int. Cl. .............................................B60p 3/34
[58] Field of Search..................296/23 R, 27; 52/66

[56] References Cited

UNITED STATES PATENTS 3,377,098  4/1968  Bontrager..............................296/27
3,456,978  7/1969  Daniels..............................296/27 X

*Primary Examiner*—Philip Goodman
*Attorney*—Merriam, Marshall, Shapiro & Klose

[57] ABSTRACT

A trailer construction adapted to be attached to and drawn rearwardly of a motor vehicle when in a relatively compact condition and which is capable, when unhitched or detached from the draft vehicle, of being quickly and easily expanded vertically as well as fore and aft by the interaction of a plurality of foldable and slidable solid or rigid panels to provide a weathertight and waterproof enclosure of relatively large interior dimensions suitable for living quarters.

3 Claims, 11 Drawing Figures

PATENTED JAN 9 1973

INVENTOR
James F. Mc. Carthy

BY Merriam, Marshall, Shapiro & Klose
ATTORNEYS

INVENTOR
James F. Mc.Carthy

ATTORNEYS

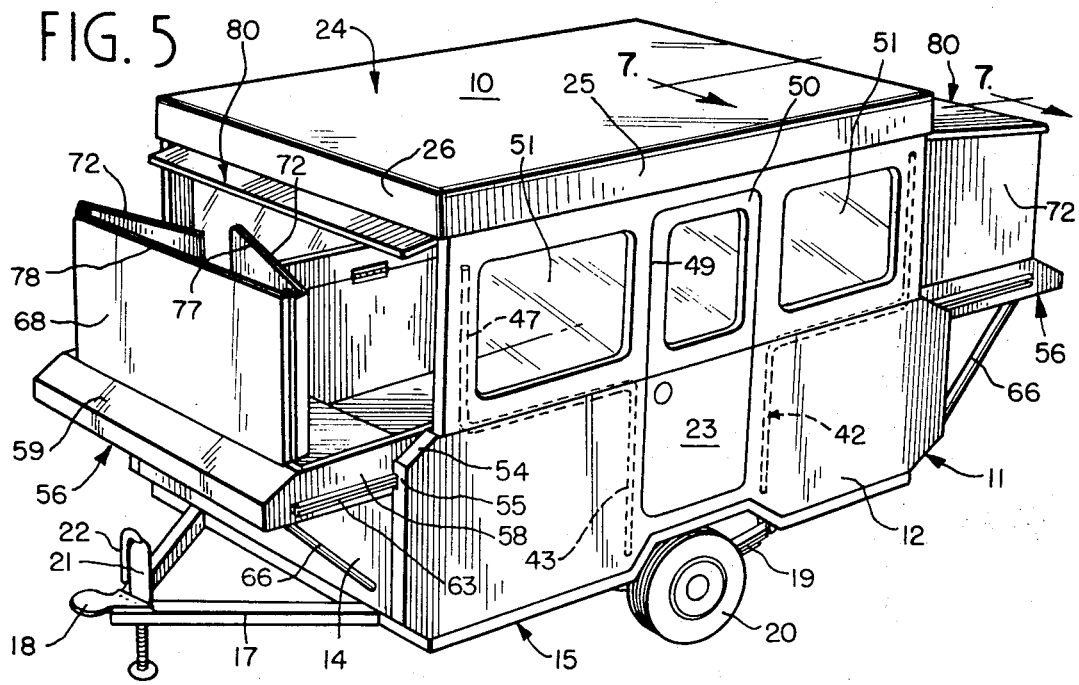

INVENTOR
James F. Mc. Carthy

ATTORNEYS

TRAVEL TRAILER CONSTRUCTION

This application is a continuing application of my copending application Ser. No. 767,343, filed Oct. 14, 1968 now Pat. No. 3,560,042.

This invention relates to a novel construction of a compact, easily towed travel trailer which trailer has a towing width no greater than that of a standard size American passenger automobile, and a towing height which is sufficiently low so as to not interfere with or obstruct the rear vision of the driver of the towing vehicle; the trailer may be disconnected from the towing vehicle and, without the need of any special tools or implements, quickly and easily expanded to provide all the essential living and sleeping requirements for a relatively large number of persons.

Heretofore, travel trailers of the type to which the present invention relates have for the most part fallen into one of two general categories. In one category of travel trailer, the side and end walls are in the form of solid and rigid panels which are hingedly connected together in such a manner that they may be folded inwardly to permit lowering of the roof to the base section for towing and which may be moved to an upright position to form a somewhat rigid enclosure having a height sufficient to enable an adult person to stand therein. A serious shortcoming of this type of travel trailer lies in the fact that the square foot area available for cooking, eating and sleeping is limited to the square foot area of the uncollapsible base section. The solid or rigid type of wall panel construction did not, heretofore, permit increasing or expanding area available for living quarters.

The second broad class of travel trailer contemplates the provision of means for increasing the area available for use as living quarters when the trailer is off the road and not being towed by all such means involve the use of wall panels made of flexible material or fabric such as canvas cloth or the like together with all of the known inherent disadvantages of such materials when used in travel trailer constructions. The known flexible materials lack durability when compared with solid or rigid panel structures and are subject to mildew. Furthermore, wall panels made of flexible materials require much care and upkeep to remain effective and operative.

It is therefore, one of the important objects of the present invention to provide a travel trailer construction which obviates the shortcomings of both types of travel trailer briefly described above yet embodies all of the advantages of such travel trailer types. The invention contemplates a travel trailer construction wherein all of the wall and roof panels which are movable from a folded or collapsed, compact condition when the travel trailer is being towed to an expanded or extended condition when the travel trailer is being used as living quarters are made solid or rigid as distinguished from being all or partly made of fabric material. The invention further contemplates foldable vehicle body and bed structures at the forward and after ends of the base section so as to provide an extendable bed, roof and vertical wall panel structure all operatively connected together and all made of relatively solid or rigid material for the purpose of increasing the useable area of the travel trailer.

A further object is to provide a travel trailer having extensions at both longitudinal ends of the main trailer body in which a drawer-type bed structure of rigid construction is slidable longitudinally outward from each end of the main trailer body and in which a top section of rigid construction is slidable outwardly and downwardly over each respective bed structure to form a substantial roof therefore and in which the top section is engageable with foldable end and wall panels also of rigid construction to form a substantially water and weathertight sleeve accessible from the interior of the travel trailer.

The foregoing and other important objects and desirable features inherent in and encompassed by the invention, together with many of the purposes and uses thereof, will become readily apparent from a reading of the ensuing description in conjunction with the annexed drawings, in which, FIG. 1 is a perspective view of a travel trailer construction embodying the invention; the travel trailer is illustrated in closed or collapsed condition and suitable for being towed;

FIG. 5 is a perspective view similar to FIG. 3 with the exception that the fore and aft bed extensions are shown in their extended positions and one of the bed extensions is also fully erected; FIG. 6 is an exploded view of one bed extension in its erect state without the roof section in place;

Figure 1:
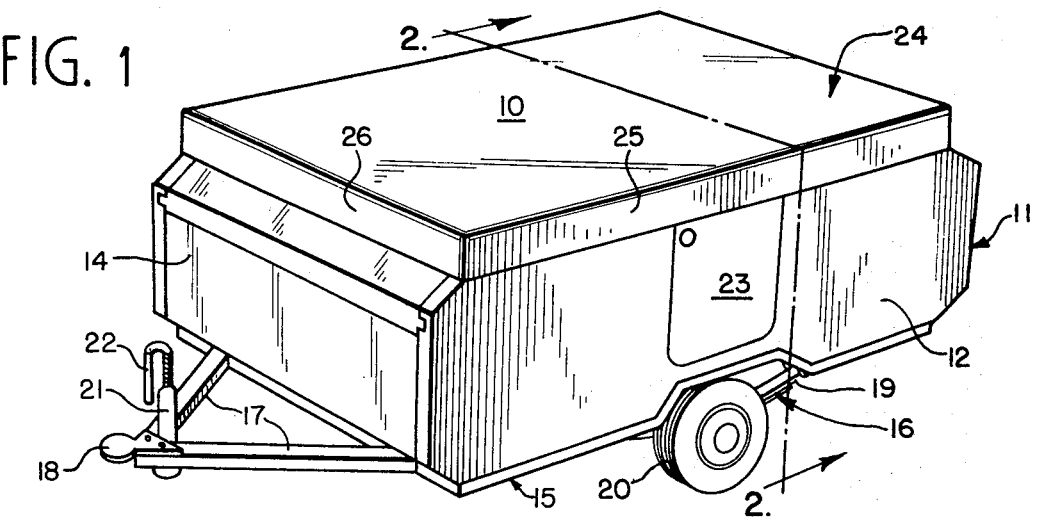

Referring to the drawings in detail, wherein like reference characters represent like elements throughout the various views, the travel trailer embodying the invention is designated generally by reference character 10. The travel trailer 10 includes a body 11 which has a generally rectangular shape when viewed in plan. The body 10 comprises longitudinally extending, generally vertical side walls 12, a floor 13, and transversely extending, generally vertical end walls 14. The side walls 12, floor 13 and end walls 14 are rigidly interconnected together and the body 11 is mounted on a chassis frame 15 and spring undercarriage 16 in a conventional manner.

The frame 15 includes longitudinally extending sill members (one of which is partially shown in FIG. 2) interconnected by a plurality of cross members (not shown). The tongue is formed by two angularly disposed members 17 joined at their rearwardmost ends to the chassis frame 15 and at their forwardmost ends to each other and to hitch 18. The undercarriage 16 consists of a transversely extending axle connected to the chassis frame 15 by means of a pair of leaf spring assemblies 19, and having a ground engaging wheel 20 mounted on each respective end thereof. When the trailer 10 is detached from the towing vehicle, the forward end of the frame 15 is supported and stabilized by a conventional mechanical jack mechanism 21 having an operating handle 22. The hitch 18 is connected to a tow-bar or other fixture on the rear of the towing vehicle when the trailer 10 is being towed.

The trailer body 11 may be made of steel, aluminum or other suitable material and may be of a double-wall panel construction without departing from the spirit and scope of the invention. One side wall 12 is provided with a door section 23 for closing a door opening formed in the side wall substantially midway along its length. It is also to be understood that the interior of the body 11 is provided with the usual furnishings (not shown) such as storage cupboards and the like.

Figure 2:
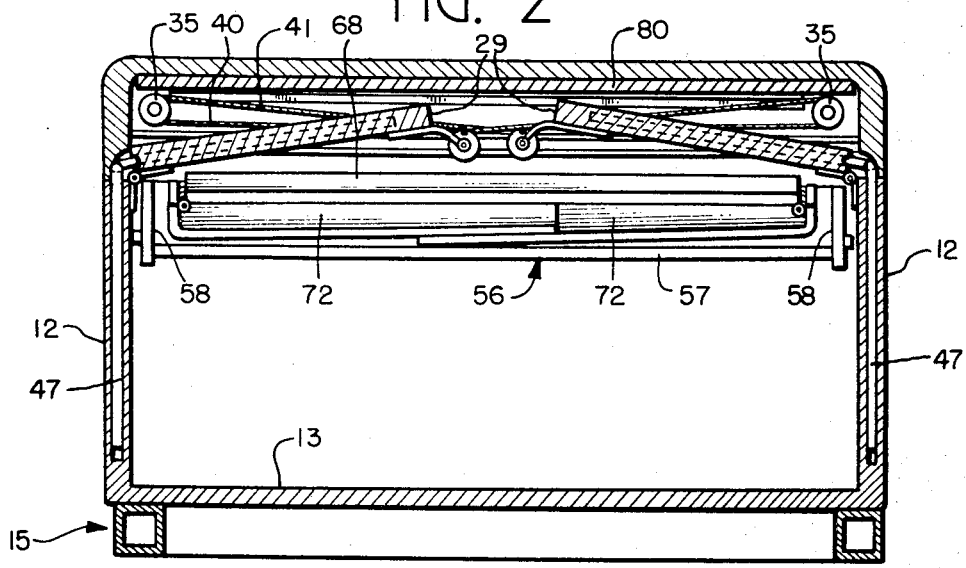
FIG. 2 is a vertical sectional view taken substantially along line 2—2 of FIG. 1.

As clearly shown in FIGS. 1 and 2, a generally rectangular, one-piece top 24 is positionable over the opening defined by the body side and end walls 12, 14, respectively, to close the same when the travel trailer 10 is in its collapsed condition. The one-piece top 24, which is constructed to relatively rigid and solid material as distinguished from flexible fabric material, is provided with longitudinal depending side flanges 25 and transverse depending flanges 26, the lowermost edges of which rest upon the uppermost edges of the body side and end walls 12, 14, respectively, when the travel trailer 10 is in condition for being towed. Suitable weather stripping means (not shown) is provided between the engaging edges of the top 24 and the side and end walls 12, 14, respectively, to seal the joint therebetween.

Figure 4A:
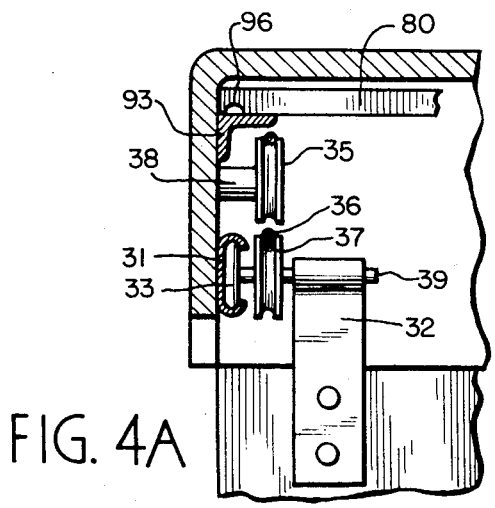
FIG. 4A is an enlarged side elevational view, partly in section, of the equalizing cable.
Figure 3A:
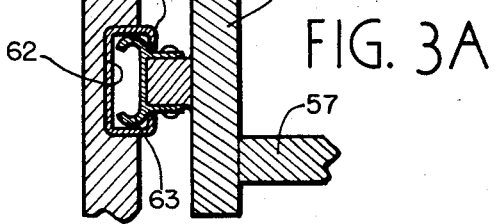
FIG. 3A is an enlarged sectional view taken substantially along line 3A—3A of FIG. 3.
Figure 3:
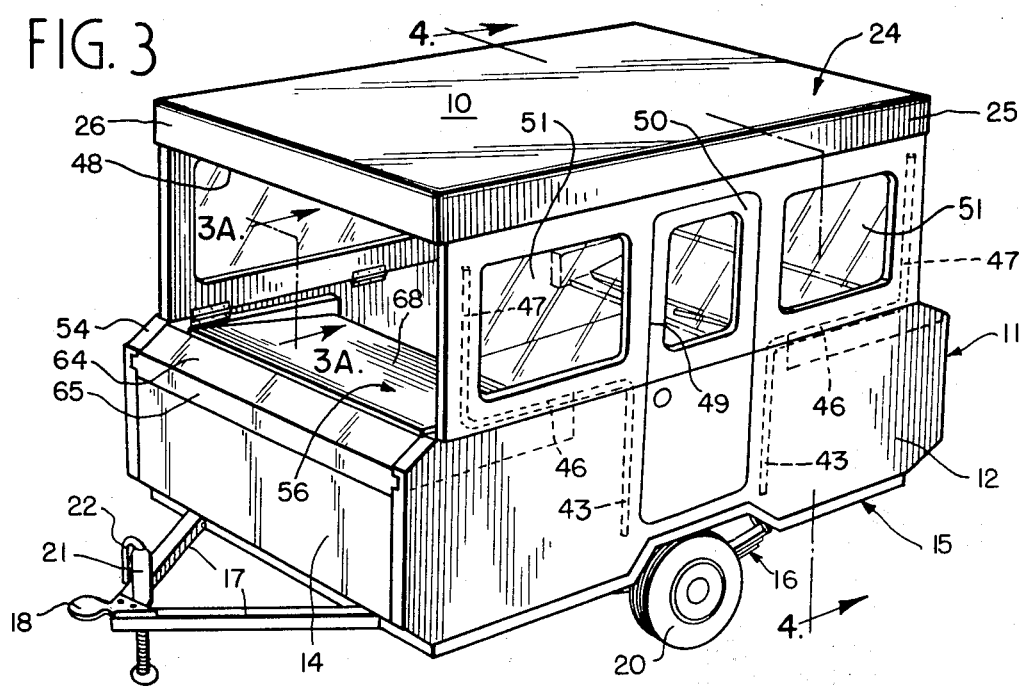
FIG. 3 is a perspective view similar to FIG. 1 with the exception that the travel trailer is partially opened and expanded.
Figure 4:
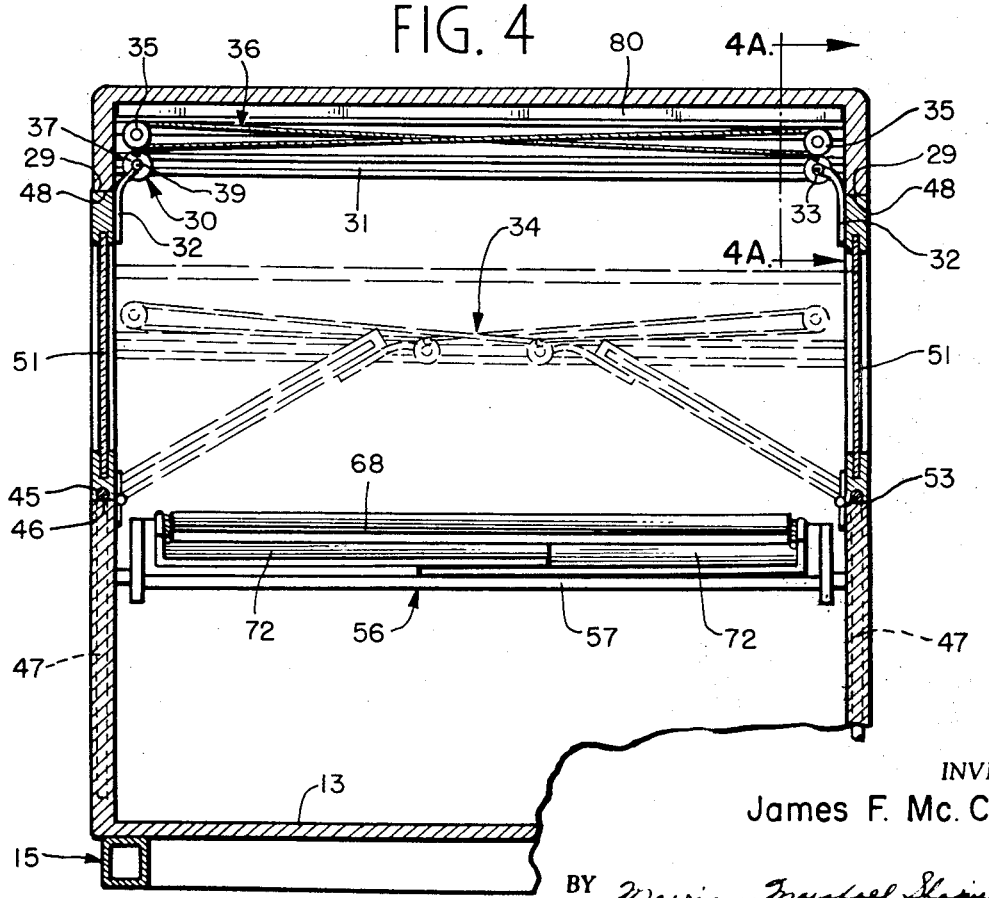
FIG. 4 is a vertical sectional view taken substantially along line 4—4 of FIG. 3.

When the top 24 is in its extended position as shown in FIG. 3, the spaced and parallel side walls are defined by the body side walls 12 and generally rectangular, upper panels 27. Each upper panel 27 has its lowermost edge, as viewed in FIG. 3, hingedly connected to the uppermost edge of a respective one of the side walls 12 by means of a plurality of hinge means, designated generally by reference character 28. The arrangement of the hinge means 28 allows the upper panels 27 to be swung between erected upright positions, as illustrated in FIG. 3, and inwardly folded, stored positions, as shown in FIG. 2. The edge 29 of each upper panel 27 opposite the edge hingedly connected to a respective side wall 12 is operatively connected to the top 24 by means of a pair of roller and track assemblies, designated generally by reference character 30. As best shown in FIGS. 2, 4, and 4A, each roller and track assembly 30 includes an elongated, transversely extending and substantially U-shaped track 31 which is securely fastened to the interior surface of a respective end flange 26 of the top 24. Rigidly fixed to each upper panel 27 adjacent the longitudinal ends thereof are a pair of spaced brackets 32. Each bracket 32 projects beyond the edge 29 of a respective upper panel 27 and rotatably supports a roller 33, as best shown in FIG. 4A. One roller 33 carried by each upper panel 27 is received and confined within a respective track 31. From the foregoing, it will be appreciated that as the upper panels 27 are swung from their inwardly folded, stored position, as shown in FIG. 2, to their erected upright positions, as shown in FIG. 3, the rollers 33 move transversely outwardly in the track 31 and simultaneously the top 24 is raised from its collapsed or stored position to a fully raised position. When the top 24 is in its fully raised position, sufficient headroom is provided within the interior of the trailer 10 to allow adult persons to stand therein.

Preferably as the top 24 moves between its collapsed or stored and erected, fully raised positions, it remains substantially horizontally disposed and to insure the maintenance of such horizontal disposition of the top 24, an equalizing cable mechanism 34 is employed at one end of the top 24. The equalizing cable mechanism 34, which is disposed on the interior side of one of the end flanges 26, includes a pair of cable sheaves 35, an endless cable 36 and a pair of cable connecting members 37. The cable sheaves 35 are rotatably supported by means of bearing brackets 38 secured to one of the top end flanges 26 adjacent its transverse ends. The rotational axes of the cable sheaves 35 extend longitudinally and are substantially parallel to each other and to the rotational axes of the rollers 33. The cable connecting members 37 are in the form of cable sheaves and each connecting member 37 is mounted on a respective cable sheave shaft 39 for independent rotation. Referring to FIG. 2, it will be noted that the endless cable 36 is rigidly fastened to the left hand cable connecting member 37 as by welding or the like. A run 40 of the cable 36 extends from the point where it is connected to the left hand cable connecting member 37, as viewed in FIG. 2, and is trained around the left hand cable sheave 35. Extending from the left hand cable sheave 35 is a cable run 41 which has one end rigidly fastened to the right hand cable connecting member 37, as viewed in FIG. 2. The cable 36 extends from the right hand cable connecting member 37, around the right hand cable sheave 35, to the left hand cable connecting member 37. The endless cable 36 remains taut at all times. From the foregoing, it will be appreciated that the equalizing cable mechanism 34 constrains the rollers 33 to move in the track simultaneously and uniformly at the same speed and thus cocking or tilting of the top 24 as it is being raised or lowered is effectively prevented.

Means in the form of a plurality of torsion bar springs 42 are provided for facilitating the raising of the top 24 and swinging of the upper panels 27 when the trailer is being readied for occupancy. The torsion bar springs 42 are substantially Z-shaped and one leg section 43 of each torsion bar spring 42 extends vertically and is confined within a respective pocket of a plurality of pockets formed in the side walls 12. The edges 29 of the upper panels 27 in engagement with the uppermost edges of the body side walls 12 when the upper panels 27 are in their fully erected, upright positions are each provided with a pair of grooves 45, each of which is adapted to accommodate the horizontally disposed mid section 46 of a respective torsion bar spring 42, as shown in FIG. 4. The leg section 47 opposite the leg section 43 of each torsion bar spring 42 is disposed within a respective one of a plurality of elongated pockets formed in the upper panels 27. The leg sections 47 are capable of sliding with respect to the upper panels 27 along the longitudinal axes of the pockets in which they are confined. Relative sliding movement of the leg section 47 is necessary because the aligned longitudinal axes of the mid section 46 of the torsion bar springs 42 associated with each upper panel 27 is horizontally offset slightly from the pivotal axis of such upper panel 27. The torsion bar springs 42, are constructed in such a manner that when a spring 42 is in a free, unstressed state the free end of the leg section 47 thereof is disposed on one side of a plane containing the mid section 46 and the leg section 43 and in order to stress spring 42, the leg section 47 is rotated about the axis of the mid section 46 in a direction to cause the free end of the leg section 47 to move to the other side of such plane. It will also be appreciated that the resilient force exerted by the torsion bar spring 42 increases as the angular movement of the leg section 47 with respect to the leg section 43 in said direction increases. Thus, when the top 24 is in its lowered position and the upper panels 27 are in their inwardly folded, stored positions, the torsion bar springs 42 are fully tensioned or stressed and are exerting maximum forces on the upper panels 27 tending to swing them to the upright positions. It will also be appreciated that torsion bar springs 42 are still slightly tensioned when the upper panels 27 are in their fully opened or upright position to counteract any tendency for the upper panels 27 to inadvertently swing inwardly in use. When the top is in its fully raised position as shown in FIG. 4, the lowermost edges 48 of the top side flanges 25 bear against the upper panel edges 28.

Preferably a gasket strip (not shown) will extend along the edges 48 of the top flanges 25 and may be formed of vinyl, rubber or other material, to provide an effective seal against the entry of moisture, dirt and wind through the joint between the top 24 and the upper panels 27. One of the upper panels 27 will preferably be interrupted by the upper margin 49 of a door opening registering with the door opening formed in one of the body side walls 12. A door section 50, hingedly connected to the upper panel 27, is adapted to close the door opening 49. If desired, suitable latch belt or other means may be provided to connect the upper and lower door sections 50, 23, respectively, so as to be swingable in unison, although this is not essential or required and a Dutch door effect may be employed instead. Windows 51 may also be provided in any number and size of the upper panels 27. It is also to be understood that suitable releasable latch means (not shown) are to be provided to secure the top 24 in its lowered position to the trailer body 11 inasmuch as the torsion bar springs 42 are highly tensioned when the top 24 is in this position and exert a relatively strong force tending to lift the top 24.

Figure 7:
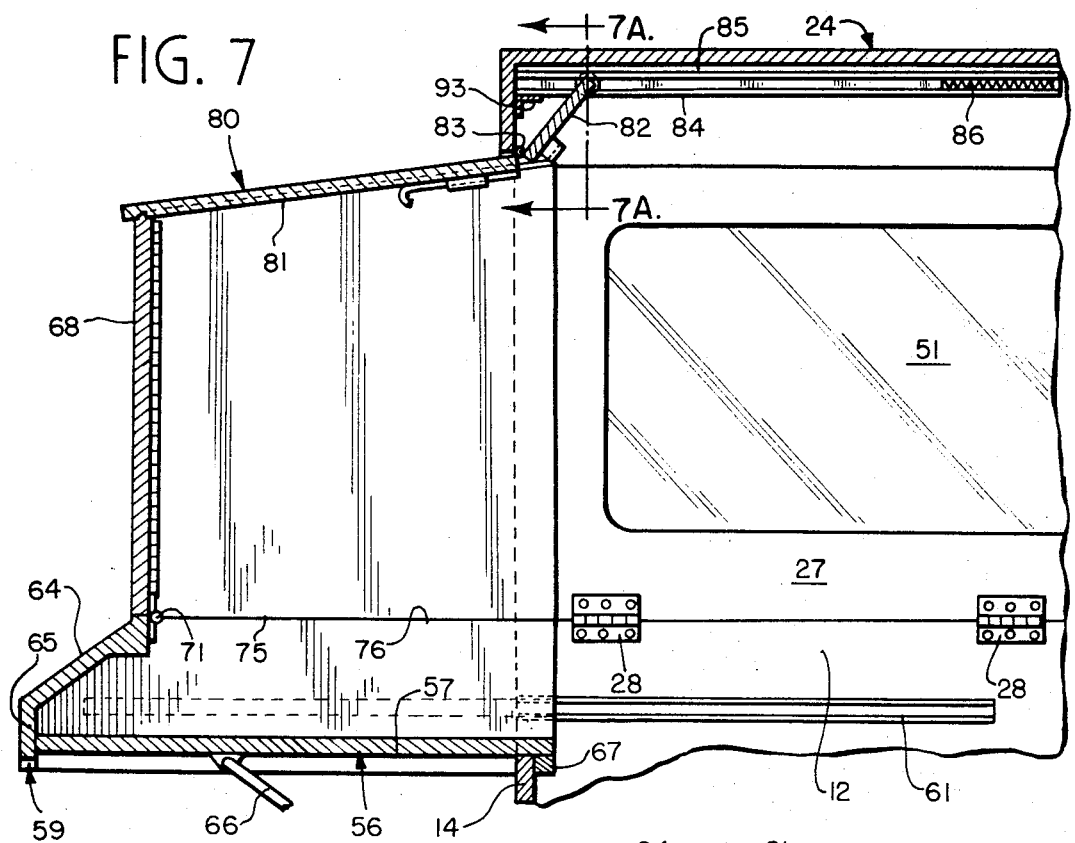
FIG. 7 is a fragmentary side elevational view, partially in section, of the interior of the partially erected travel trailer illustrated in FIG. 5.

As stated hereinbefore, an objective of the invention is to provide a travel trailer construction wherein collapsible bay or wing areas at the rear and forward ends of the trailer body 11 and suitable for use as sleeping quarters are incorporated therein. Inasmuch as the structure involved in the construction of the bay or wing area at the forward and rear ends of the trailer body 11 is the same, only structure and construction of one bay or wing area will be described in detail herein. Referring to FIG. 6, it will be noted that the upper edge 52 of the trailer body end wall 14 is vertically spaced below the level of the uppermost edges 53 of the body side walls 12 to partially define an opening. The opening is further defined by an inclined edge 54 formed on each body side wall 12 and extending from the uppermost edge 53 to a vertical edge 55. The vertical edges 55 also partially define the opening in the end of the body 11. A bed unit 56 is provided in the form of a drawer having a bottom or floor 57, side walls 58, and an end wall 59. As evidenced by comparing FIGS. 3 and 5, the bed unit 56 is movable through the opening between a stored position and an extended position. A pair of guide and track means, designated generally by reference character 60, are employed for supporting the bed unit 56 for horizontal sliding movement with respect to the trailer body 11. Each guide and track means includes a substantially U-shaped, horizontally extending track 61 fixed to a respective side wall 12 and which is preferably recessed or countersunk in a pocket-like groove 62 formed in the inner face of such respective body side wall 12. Each track 61 is adapted to slidingly receive an elongated guide bar 63 fastened to and projecting from the exterior face of a respective side wall 58 of the bed unit 56. If desired the engaging surfaces of the track 61 and guide bar 63 can be coated with Teflon or like material to facilitate sliding of the bed unit 56 with respect to the trailer body 11. It will be noted that end wall 59 of the bed unit 56 is formed with an inclined, outwardly facing surface 64 which lies substantially in the plane containing the inclined edges 54 of the side walls 12 when the bed unit 56 is in its closed or stored position. Similarly, a vertically disposed, outwardly facing surface 65 of the end wall 59 lies substantially in a vertical plane containing the vertical, end edges 55 of the side walls 12 when the bed unit 56 is fully retracted. Thus, the end opening in the trailer body 11 for accommodating the bed unit 56 is closed in a relatively weathertight manner by the end wall 59 of the bed unit 56 whenever the bed unit 56 is in its stored position. Suitable weather stripping means (not shown) may be employed at the joint between the body 11 and the end wall 59 to further seal the joint if desired. From the foregoing, it will be appreciated that the bed unit 56 can be slid inwardly and outwardly as the guide bars 63 slide in the tracks 61, thereby giving substantial support to the inner end of the bed unit floor 58, and retaining it in a generally horizontal position, both while in the retracted or stored and extended positions. A mattress and other bedding gear (not shown) is preferably placed on the bed unit floor 57 to form a suitable bed or lounge structure. To provide additional support for the bed unit 56 when in its extended position, props 66, in the form of elongated rods are positionable so as to extend in an inclined fashion between the floor 56 adjacent to the end wall 59 and the trailer body end wall 14 or the chassis frame 15, as partially shown in FIG. 5. A transversely extending stop bar 67 is rigidly fastened to the underside of the bed floor 57 and is adapted to engage the trailer body end wall 14, as shown in FIG. 7, to limit outward sliding of the bed unit 56 and to establish the fully extended or expanded position thereof.

Each bed unit 56 further includes a generally rectangular, rigid end panel 68 which has one transversely extending edge 69 hingedly connected to the uppermost edge 70 of the bed end wall 59 by means of a hinge structure 71. The hinge structure 71 permits the end panel 68 to swing between a generally upright vertical position illustrated in FIG. 5 and corresponding to the erected or expanded condition of the end panel 68. and a generally horizontal position, as shown in FIG. 2 and corresponding to the stored or collapsed condition of the end panel 68. The side walls of the bed unit 56 are formed by a pair of rigid side panels 72. As shown in FIG. 6, one edge of each side panel 72 is defined by a projecting short flange 73 disposed in a plane substantially at right angles to the general plane of the side panel. Each flange 73 is hingedly connected to a respective edge of the end panel 68 by means of a hinge structure 74. The offset flanges 73 are provided so that when the side panels 72 are in their stored collapsed condition as shown in FIG. 2, they are disposed between the side walls 58 of the bed unit and will not hamper sliding of the bed unit 56 with respect to the trailer body 11. When the side panels 72 are in their unfolded positions, they are disposed substantially vertically with the bottom edge 75 resting upon the uppermost edge 76 of a respective bed side wall 58, as shown in FIG. 7. It will also be appreciated that each side panel 72 lies substantially in the vertical plane of a respective bed side wall 58 when in its erected position with the exception of the flange 73 thereof which is disposed in the vertical plane of the end panel 68. It will be noted from viewing FIG. 2 that the edge portions of the side panels 72 opposite the flanges 73 overlap each other when they are in their stored positions. It will also be noted that the edge 77 of each side panel 72, which is uppermost when the side panel is in its unfolded erected position, is inclined downwardly toward the flange 73 and such edge 77 and the uppermost edge of the flange 73 and the edge 78 of the end panel 68 opposite the hinge structure 71 is provided with a projecting tongue 79 which preferably has a semi-cylindrical cross sectional shape. The purpose of the tongue 79 and the importance of the inclined edge construction of the side panels 72 will be pointed out presently.

Figure 7B:
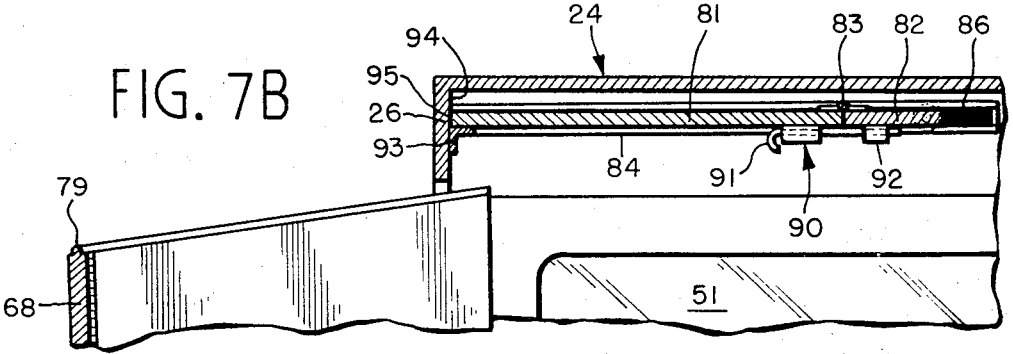
FIG. 7B is a view similar to FIG. 7 with the exception that the roof section for the bed extension illustrated is shown in its retracted or stored position.

The roof of each bed unit 56 is designated generally by reference character 80 and includes a rectangular main section 81 which has one edge pivotally connected to a flap section 82 by means of a hinge structure 83. The hinge structure 83 permits the main section 81 and flap section 82 to pivot with respect to each other between a flat relationship wherein they lie substantially in a common plane, as illustrated in FIG. 7B, and a folded relationship, as shown in FIG. 7, wherein the main section 81 is angularly oriented with respect to the flap section 82.

Figure 7A:
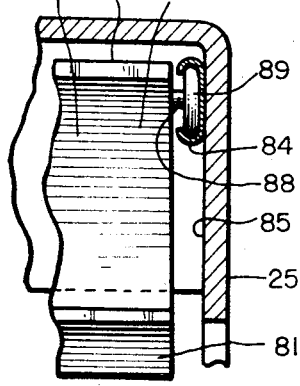
FIG. 7A is an enlarged, vertical sectional view taken substantially along line 7A—7A of FIG. 7.

Each roof 80 is stored with the section 81 and 82 in their flat relationship beneath the top 24 when the trailer 10 is in condition for over-the-road towing. Referring specifically to FIGS. 7, 7A and 7B, it will be noted that the means for storing each roof 80 includes a pair of substantially U-shaped elongated tracks 84, each track 84 being secured to the interior surface 85 of respective side flange 25. Each track 84 extends longitudinally from a respective end flange 26 of the top 24 and has a length somewhat greater than the length of the roof 80 measured in a longitudinal direction when the main section 81 and the flap section 82 are in the flat position. Anti-rattle means 86 in the form of a helically-wound compression spring is provided at the innermost end of each track 84. The manner in which the anti-rattle means 86 functions will be pointed out presently. As partially shown in FIG. 7A, the free edge 87 of each flap section 82 is provided with a pair of transversely projecting pivot shafts 88 each of which rotatably supports a roller 89. Each roller 89 is confined with a respective track 88. From the foregoing, it will be appreciated that the innermost end of each roof 80 is supported for longitudinal sliding movement with respect to the top 24. As clearly illustrated in FIG. 7B, a releasable latch device 90 is provided at the pivotal connection of the main and flap sections 81, 82 respectively. The latch device 90 includes a slidable latch belt 91 carried by the main section 81 of the roof 80 which is insertable in a latch keeper 92 mounted on the adjacent flap section 82 when the sections 81 and 82 are in their flat relationship to prevent pivotal movement between sections 81, 82. When the roof 80 is in its stored position the edge of the main section 81 spaced and parallel to the hinge structure 83 is supported on a transversely extending bracket 93 securely fastened to the interior surface 94 of the respective top end flange 26. It is also to be understood that the length of the roof 80 measured in a longitudinal direction when the section 81 and 82 are in their flat relationship is greater than the distance between the interior surface 94 of a top end flange 26 and the spring end of an associated anti-rattle means 86 when the spring is in its uncompressed or free state. Consequently, when the roof 80 is in its stored position, as shown in FIG. 7B, with one end supported by the rollers 89 and tracks 88 and its opposite end portion resting upon the bracket 93 and the latch device 90 in its locked condition, the spring is engaged by a respective roller 89 and is compressed. In this manner the anti-rattle means 86 are effective to yieldably urge the edge 95 firmly into abutting engagement with a respective top end flange 26. Thus unwanted and undesirable movement or shifting of the stored roof 80 with respect to the top 24 when the trailer 10 is in transit is effectively prevented. However, when it is desired to position the roof 80 over the extended bed unit 56, suitable handles (not shown) secured to the main section 81 are conveniently grasped to bodily move the roof 80 longitudinally inwardly, further compressing the anti-rattle springs, until the edge 81 of the main section 81 clears the bracket 93. The edge 81 may then be lowered below the level of the support bracket 93, as shown in FIG. 5.

When it is desired to convert the trailer 10 from its mobile, compact condition to its erected or expanded condition, the top 24 is first moved to its fully raised position with the assistance of the tensioned torsion bar springs 42. Once the top 24 is fully erected, the bed units 56 are slid horizontally to their fully extended positions and the support rods 66 are put in place. Thereafter, the end panel 68 and the side panels 72 of each bed unit 56 are bodily swung about the pivoted axis provided by the hinge structure 71 until the end panel 68 assumes a vertical upright position as shown in FIG. 5. The side panels 72 are then swung approximately 90° until an edge portion of each side panel engages and is overlapped by an edge portion of a respective one of the upper panels 27. If desired weather sealing strip means (not shown) may be provided between the overlapping edge portions of each pair of side and upper panels. In order to prevent inadvertent inward swinging of the side panels 72, suitable releasable latch means (not shown) may be provided between each side panel 72 and the upper panel 27 which it engages. With the bed unit end and side panels 68, 72 erected, the roof edge of 95 of each roof 80 is released from engagement with its respective support bracket 93 and is positioned over the erected end and side panels, as shown in FIG. 7. However, in order to accomplish such action, it is necessary to first release the latch devices 90 to permit the main section 81 and the flap section 82 associated therewith to pivot with respect to each other. Without the provision of such pivotal action between the main and flap section 81, 82 respectively, it would be impossible to position the main section 81 over and into abutting engagement with the uppermost edges of the vertically disposed end and side panels 68, 72, respectively, since the tracks 84 in which the rollers 89 are disposed is vertically spaced above the bottom edge of the top end flange 26. If desired, transversely extending weather strip means (not shown) may be attached to the flap section 82 or the lower edge of the end flange 26 so as to seal the joint between such parts when the roof 80 is in its extended position. It will also be appreciated that when the roof 80 is in its extended position, the tongue 79 formed on the edges 78 and 77 of the end and side panels 68, 72, respectively, are received in a semi-circular groove 96 formed in the underside of the roof main section 81 overlying the end and side panels 68, 72. The interaction of the tongue 79 and the groove 96 enhances the rigidity of the assembled or erected wing or bay structure and also serves to provide a highly effective weathertight joint between the vertical panels 68 and 72 and the extendable roof 80. It is also to be understood that suitable window openings and windows (not shown) could be provided in the end and/or side panels 68, 72 without departing from the spirit and scope of the invention. It will also be appreciated that by virtue of the fact that the top edges 77 of the side panels 72 are inclined, the roof 80 when in its extended position as shown in FIG. 7, slopes downwardly slightly from the top end flange 26 to facilitate run-off of rain. Additionally, releasable latch means (not shown) of any well known type may be provided between the bed unit side panels 72 and the roof sections 81 when the side panels 72 are in their erected positions and the roofs 80 are in their extended positions to prevent the roofs from being inadvertently disengaged from the panels 72.

What is claimed is:

1. In a travel trailer comprising a wheel-supported, generally rectangularly shaped, open-topped body including;
    a pair of transversely spaced, longitudinally extending, generally upright side walls,
    a pair of longitudinally spaced, transversely extending, generally upright end walls, and
    a generally rectangularly shaped top movable from a lowered position on top of said body wherein it serves as a closure therefor and a raised, erected position wherein it is vertically spaced above said body, the improvement comprising:
    an opening in at least one of said end walls extending from the uppermost edge thereof; and
    at least one bed unit movable longitudinally through an end wall opening from a retracted position wherein it is disposed in said body to an extended position wherein it is horizontally disposed substantially exteriorly from said body, said bed unit including;
    a flat, generally horizontally disposed bottom, transversely spaced and parallel side walls rigidly connected to and extending normally from said bottom,
    a transversely extending end wall rigidly connected to and extending normally from said bottom,
    a generally rectangularly shaped end panel of relatively rigid construction having one transversely extending edge hingedly connected to the uppermost edge of said bed unit end wall and swingable from stored position disposed between said bed unit side walls to erected position, forming an upright extension of said bed unit end wall,
    a pair of transversely spaced side panels of relatively rigid construction, each of said side panels having an edge portion hingedly connected to a respective edge portion of said end panel and swingable from stored position disposed between said bed unit side walls to erected position forming respective upright extensions of said bed unit side walls when said end panel is in erected position, and,
    retractable roof means for overlaying said bed unit bottom, said roof means movable between a stored position completely disposed beneath said top and an extended position overlaying said bed unit bottom and operatively engaging said bed unit end and side panels when said bed unit is in extended position and said end and side panel form extensions of said bed unit end and side walls respectively.

2. In a travel trailer comprising a wheel-supported, generally rectangularly shaped, open-topped body including;
    a pair of transversely spaced, longitudinally extending, generally upright side walls,
    a pair of longitudinally spaced, transversely extending, generally upright end walls, and
    a generally rectangularly shaped top movable from a lowered position on top of said body wherein it serves as a closure therefor and a raised, erected position wherein it is vertically spaced above said body, the improvement comprising:
    at least one bed unit movable longitudinally from a retracted position wherein it is disposed between the planes formed by said upright body side walls to an extended position wherein it is horizontally disposed substantially exteriorly from said body, said bed unit including;
    a flat, generally horizontally disposed bottom,
    transversely spaced and parallel side walls rigidly connected to and extending normally from said bottom,
    a transversely extending end wall rigidly connected to and extending normally from said bottom,
    movable end panel means for forming a generally upright extension of said bed unit end wall when said bed unit is in extended position,
        said bed unit end panel means comprising a generally rectangularly shaped end panel of relatively rigid construction having one transversely extending edge hingedly connected to the uppermost edge of said bed unit end wall and swingable from stored position disposed between said bed unit side walls to erected position, forming an upright extension of said bed unit end wall;

movable side panel means for forming generally upright extensions of said bed unit walls when said bed unit is in extended position, said bed unit side panel means comprising a pair of transversely spaced panels of relatively rigid construction, and, retractable roof means for overlaying said bed unit bottom, said roof means movable between a stored position completely disposed beneath said top and an extended position overlaying said bed unit bottom and operatively engaging said bed unit end and side panel means when said bed unit is in extended position and said end and said panel means form extensions of said bed unit end and side walls respectively.

3. A travel trailer as set forth in claim 4, wherein each of said panels has an edge portion hingedly connected to a respective edge portion of said end panel and is swingable from a stored position disposed between said bed unit side walls to an erected position forming a respective upright extension of each of said bed unit side walls when said end panel is in erected position.

* * * * *